(12) United States Patent
Cho et al.

(10) Patent No.: US 7,904,494 B2
(45) Date of Patent: Mar. 8, 2011

(54) RANDOM NUMBER GENERATOR WITH RANDOM SAMPLING

(75) Inventors: Choongyeun Cho, Hopewell Junction, NY (US); Dae Ik Kim, Fishkill, NY (US); Jonghae Kim, Fishkill, NY (US); Moon J. Kim, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 984 days.

(21) Appl. No.: 11/608,264

(22) Filed: Dec. 8, 2006

(65) Prior Publication Data

US 2008/0136697 A1  Jun. 12, 2008

(51) Int. Cl.
*G06F 1/02* (2006.01)

(52) U.S. Cl. .......................... 708/251; 708/250; 708/254

(58) Field of Classification Search ........... 708/250–256
See application file for complete search history.

(56) References Cited

U.S. PATENT DOCUMENTS

| | | | |
|---|---|---|---|
| 5,426,392 A | 6/1995 | Kornfeld | |
| 5,757,923 A * | 5/1998 | Koopman, Jr. | 708/250 |
| 6,667,665 B2 * | 12/2003 | Janssen | 708/251 |
| 7,080,106 B2 * | 7/2006 | Ikeda et al. | 708/250 |
| 7,117,233 B2 * | 10/2006 | Dichtl | 708/250 |
| 7,177,888 B2 * | 2/2007 | Wells | 708/251 |
| 7,349,935 B2 * | 3/2008 | Atsumi et al. | 708/250 |
| 2001/0023423 A1 * | 9/2001 | Marinet | 708/250 |
| 2004/0010526 A1 | 1/2004 | Dichtl | |
| 2004/0083248 A1 * | 4/2004 | Saito | 708/250 |
| 2005/0198505 A1 | 9/2005 | Smith | |
| 2006/0069706 A1 | 3/2006 | Lazich et al. | |
| 2006/0173943 A1 | 8/2006 | Luzzi et al. | |
| 2006/0218212 A1 * | 9/2006 | Mattison | 708/251 |
| 2007/0255777 A1 * | 11/2007 | Saitoh et al. | 708/251 |
| 2010/0005128 A1 * | 1/2010 | Ergun | 708/251 |

FOREIGN PATENT DOCUMENTS

CN  1710617 A  12/2005

OTHER PUBLICATIONS

Office Action from the China Patent Office, Regarding END920060252CN1, dated Jan. 8, 2010.

* cited by examiner

*Primary Examiner* — Chat C Do
(74) *Attorney, Agent, or Firm* — Patrick J. Daugherty; Driggs, Hogg, Daugherty & Del Zoppo Co., LPA

(57) ABSTRACT

In a random number generator, a first converter converts a first analog noise signal into a random digital clock signal and a second converter samples a second analog noise signal asynchronous to the first analog noise signal in response to the random digital clock signal and generates a random digital number stream. In one aspect, a random number generator output block samples the second converter random digital number stream in response to the random digital clock signal and generates a random number generator block output. In another aspect a pseudo noise source state machine generates the random digital clock signal in response to a first seed generated from the first analog noise signal, a second seed from process variation digital amplifier, and a past machine state.

20 Claims, 3 Drawing Sheets

RANDOM NUMBER GENERATOR WITH RANDOM SAMPLING

FIELD OF THE INVENTION

The present invention relates to devices, and methods and systems for random number generation, and more particularly to random number generation through random sampling.

BACKGROUND OF THE INVENTION

A random number generator (RNG) is a system or method for generating a random sequence of numbers. Certain difficulties arise in the design, application or operation of an RNG that may compromise the actual randomness of the sequence of numbers generated. For example, one approach is an algorithm-based RNG, commonly used in computer simulations of physical systems as well as in cryptography systems. However, algorithm-based RNG's are more accurately referred to as pseudo random number generators (PRNG's), since their output is not truly random due to their derivation from at least one base algorithm: their outputs only approximate some of the properties of random numbers. Moreover, the underlying algorithms may be determined through reverse engineering or computational code-breaking or hacking efforts, thus enabling defeat of cryptography security.

Analog noise-based or hardware RNG structures are generally preferred over PRNG's to produce unpredictable and unbiased digital signals derived from a fundamental noise mechanism. FIGS. 1(a) and 1(b) illustrate a prior art hardware RNG 100, which uses microscopic physical process phenomena (thermal noise, photoelectric effect or other quantum phenomena) as an analog noise source 102, an amplifier 104 to amplify the quantum-level noise output 103 into a macroscopic noise signal 105. A transducer 108 samples the amplified noise signal 105 in response to a periodic digital clock signal 109 clocked through a gate or switch 106. In one example as sampled at rising clock signal 110, the amplified noise signal 105 has a value 112 lower than the signal waveform midpoint M, and value 112 is therefore converted by the transducer 108 into a digital stream 130 zero. On the next rising clock signal 120, the amplified noise signal 105 has a value 122 higher than the signal waveform midpoint M, and this value 122 is therefore converted by the transducer 108 into a digital stream 130 one output.

If the waveform profile 126 of the rising and falling amplified noise signal 105 signal is random relative to the constant periodic clock signal 109 profile 128, then the stream of ones and zeros generated by the transducer 108 will also be random. However, the hardware RNG 100 may be influenced by deterministic forces that may compromise or even program the randomness of the stream of numbers 130.

More particularly, electromagnetic radiation interference (EMI) emitted by other electrical circuits carrying rapidly changing signals as a by-product of their normal operation may cause unwanted signals such as crosstalk and power supply noise to impact the RNG 100. Strong EMI forces may also reprogram the random amplified noise signal 105, in one example through clock signal coupling with another clock signal through a structural substrate. FIG. 1(b) illustrates the effect of a strong radio frequency interference (RFI) signal 170 on the hardware RNG 100. RFI is interference caused by the portion of the electromagnetic spectrum above audio wavelengths (about 20 kHz) but below infrared wavelengths (about 30 THz), and includes amplification modulation (AM), shortwave, frequency modulation (FM), television (TV), ham radio and citizen's band (CB) broadcast signals. RFI may be generated by commercial, governmental and civilian broadcasters, as well as by local devices such as remote controls, wireless phones, cellular phones, microwave ovens, motion sensors, radar systems, and medical and industrial devices.

The strong RFI signal 170 acts upon and effectively overwhelms the amplified noise signal 105, thereby producing a resultant interfered noise signal 172 having a waveform profile 192 substantially similar to the RFI signal 170 waveform profile 190. And if the RFI signal 170 has a periodicity and profile 190 substantially in common with the oscillating digital value profile 128 of the sampling clock signal 109, then at each clock signal sampling point (the rising edges 110, 120 of the clock signal 109) the interfered amplified noise signal 172 has a value 182,184 higher than the signal waveform midpoint M and is converted by the ADC 108 into a digital stream 130 one output. Thus, the otherwise random data stream 186 has been now programmed to an all-ones signal. This may occur unintentionally, or it may be intentional through synchronization-based hacking techniques, either of which results in a breach of cryptographic system security.

Thus, although algorithm-based pseudo random number generators may provide simple, cost effective random number generation, the underlying algorithm methodology renders the PNRG inherently insecure for cryptography applications. And although hardware random number generators can in theory produce truly random number streams not subject to decryption, EMI modulation of the hardware noise source signals may compromise randomness, and in some conditions even allow programming of the generated number stream.

SUMMARY OF THE INVENTION

Aspects of the present invention address these matters and others. More particularly, random number generators are provided comprising a first analog noise source configured to generate a first analog noise signal and a second analog noise source configured to generate a second analog noise signal asynchronous to the first analog noise signal. A first converter is coupled to the first analog noise source and configured to convert the first analog noise signal into a random digital clock signal defining a random series of a plurality of sampling periods. A second converter coupled to the second analog noise source and the first converter samples the second analog noise signal in response to the random digital clock signal and generates a random digital number stream.

In one aspect, the first and second analog noise sources are physical process phenomena. In another aspect a random number generator output block coupled to the first converter and the second converter samples the second converter random digital number stream in response to the random digital clock signal and generates a random number generator block output.

In one aspect, an amplifier is coupled between the second analog noise source and the second converter, wherein the first converter is a voltage-to-timing converter and the second converter is an analog-to-digital converter. In another aspect, the first converter is a pseudo noise source state machine, with a voltage-to-digital converter coupled between the first analog noise source and the pseudo noise source state machine generating a random first seed in response to the first analog noise signal; a process variation digital amplifier coupled to the pseudo noise source state machine generates a random second seed; and the pseudo noise source state machine is configured to generate the random digital clock signal in response to the first seed, the second seed and a past pseudo noise machine state. In one aspect the process variation digital amplifier comprises a plurality of microprocessor chips with unique random seeds. In another aspect, the process variation digital amplifier determines the second seed from an aging effect of each of the plurality of unique random seeds.

Still further, methods for random number generation are provided comprising the steps of generating a first analog noise signal, converting the first analog noise signal into a random digital clock signal comprising a random series of a plurality of sampling periods, generating a second analog noise signal asynchronous to the first analog noise signal, and sampling the second analog noise signal in response to the random digital clock signal to generate a random digital number stream. In one aspect, first and second analog noise sources generate the first and second analog noise signals from first and second physical process phenomena, respectively. In another aspect, the method includes sampling the random digital number stream in response to the random digital clock signal to generate a random number generator block output.

In one aspect, a method further comprises amplifying the second analog noise signal, converting the amplified second analog noise signal with an analog-to-digital converter means to generate the random digital number stream, and converting the first analog noise signal into the random digital clock signal with a voltage-to-timing converter means. In another aspect, a method further comprises generating a random first seed in response to the first analog noise signal, a process variation digital amplifier means generating a random second seed, and a pseudo noise source state machine means generating the random digital clock signal in response to the first seed, the second seed and a past pseudo noise machine means state.

In another method, the process variation digital amplifier means comprises a plurality of microprocessor chips, further comprising the steps of assigning a unique random seed to each of the plurality of chips; and determining the second seed from the plurality of unique random seeds. In another aspect the second seed is further determined from an aging effect of each of the plurality of unique random seeds.

Still yet, any of the components of the present invention can be deployed, managed, serviced, etc. by a service provider who offers to provide random number generation, for example through computer systems or other devices. Thus, in one aspect, a method for deploying an application for random number generation is provided, comprising providing a computing infrastructure being operable to generate a first analog noise signal, converting the first analog noise signal into a random digital clock signal comprising a random series of a plurality of sampling periods, generating a second analog noise signal asynchronous to the first analog noise signal, and sampling the second analog noise signal in response to the random digital clock signal to generate a random digital number stream.

In another application, first and second analog noise sources generate the first and second analog noise signals from first and second physical process phenomena, respectively. In another application, the random digital number stream is sampled in response to the random digital clock signal to generate a random number generator block output.

In another application, a process further comprises amplifying the second analog noise signal, converting the amplified second analog noise signal with an analog-to-digital converter means to generate the random digital number stream, and converting the first analog noise signal into the random digital clock signal with a voltage-to-timing converter means.

In another aspect, the process further comprises generating a random first seed in response to the first analog noise signal, a process variation digital amplifier means generating a random second seed, and a pseudo noise source state machine means generating the random digital clock signal in response to the first seed, the second seed and a past pseudo noise machine means state. In another aspect the process variation digital amplifier means comprises a plurality of microprocessor chips, further comprising the steps of assigning a unique random seed to each of the plurality of chips and determining the second seed from the plurality of unique random seeds. And in another aspect of the application, the second seed is further determined from an aging effect of each of the plurality of unique random seeds.

Still further, an article of manufacture comprising a computer usable medium having a computer readable program embodied in said medium may be provided, wherein the computer readable program, when executed on a computer, causes the computer to practice random number generation according to the present invention, for example by generating a first analog noise signal, converting the first analog noise signal into a random digital clock signal comprising a random series of a plurality of sampling periods, generating a second analog noise signal asynchronous to the first analog noise signal, and sampling the second analog noise signal in response to the random digital clock signal to generate a random digital number stream.

In another aspect, the article of manufacture computer readable program, when executed on a computer, may further cause the computer to generate the first and second analog noise signals from first and second physical process phenomena, respectively. In another aspect, the random digital number stream is sampled in response to the random digital clock signal to generate a random number generator block output. In another aspect, the computer process further comprises amplifying the second analog noise signal, converting the amplified second analog noise signal with an analog-to-digital converter means to generate the random digital number stream, and converting the first analog noise signal into the random digital clock signal with a voltage-to-timing converter means.

Another article of manufacture computer readable program, when executed on a computer, invokes the process steps of generating a random first seed in response to the first analog noise signal, a process variation digital amplifier means generating a random second seed, and a pseudo noise source state machine means generating the random digital clock signal in response to the first seed, the second seed and a past pseudo noise machine means state. In another aspect, the process variation digital amplifier means comprises a plurality of microprocessor chips, further comprising the steps of assigning a unique random seed to each of the plurality of chips and determining the second seed from the plurality of unique random seeds. And, in another aspect of the application, the second seed is further determined from an aging effect of each of the plurality of unique random seeds.

BRIEF DESCRIPTION OF THE DRAWINGS

These and other features of this invention will be more readily understood from the following detailed description of the various aspects of the invention taken in conjunction with the accompanying drawings in which.

Figure 1A:
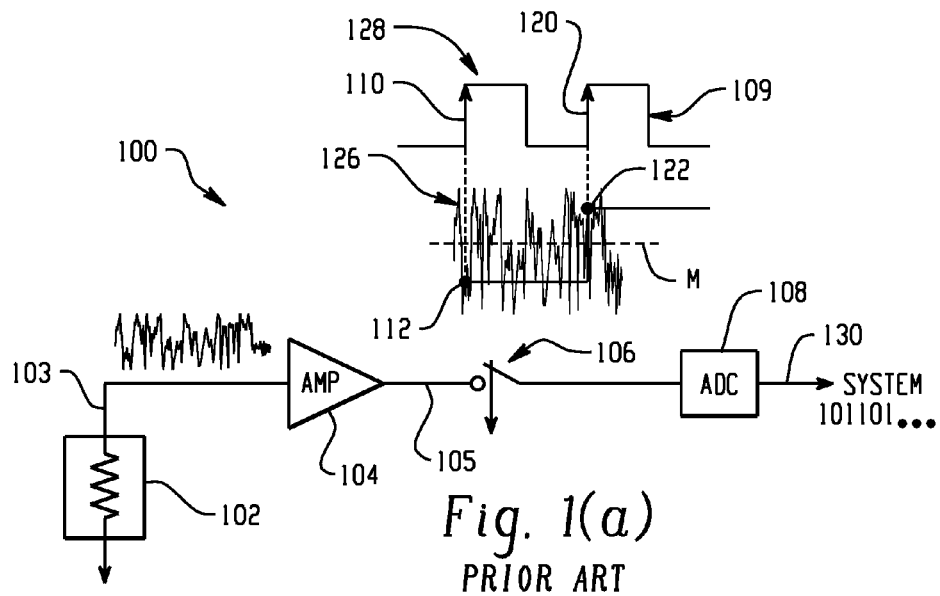
FIGS. 1(a) and 1(b) are schematic illustrations of a prior art hardware random number generator.

The invention may take form in various components and arrangements of components, and in various steps and arrangements of steps. The drawings are intended to depict only typical embodiments of the invention and are not to be considered as limiting the scope of the invention. Moreover, the drawings are not necessarily to scale and are merely schematic representations not intended to portray specific parameters of the invention. In the drawings, like numbering represents like elements.

DETAILED DESCRIPTION OF THE INVENTION

Still further aspects of the present invention will be appreciated by those of ordinary skill in the art upon reading and understanding the following detailed description. For convenience purposes, the Detailed Description of the Invention has the following sections:
I. General Description
II. Computerized Implementation.

I. General Description

Figure 2A:
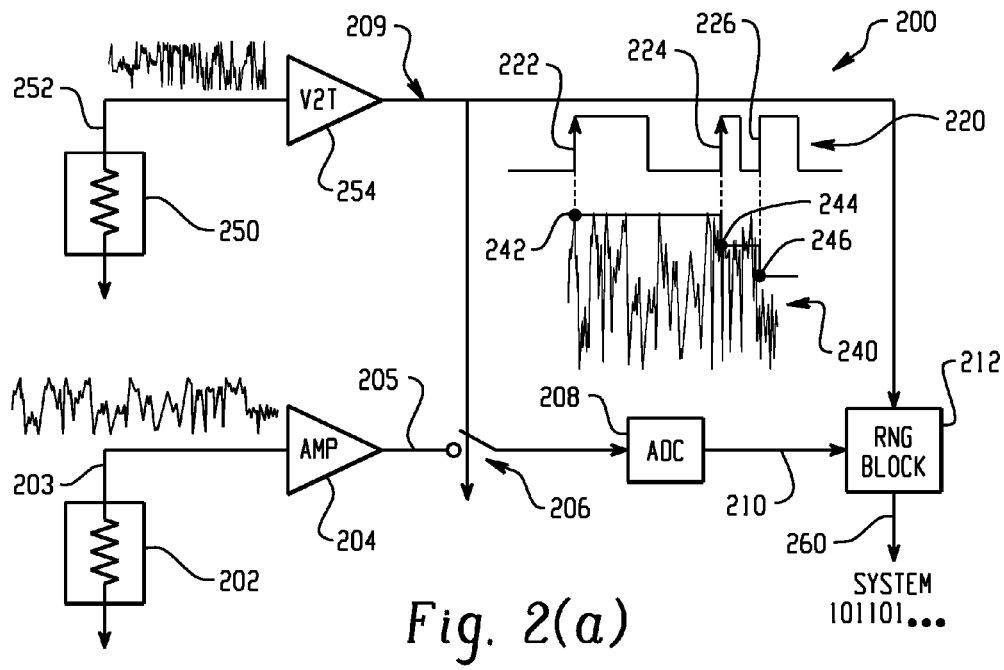
FIGS. 2(a) and 2(b) are schematic illustrations of a random number generator according to the present invention.
Figure 2B:
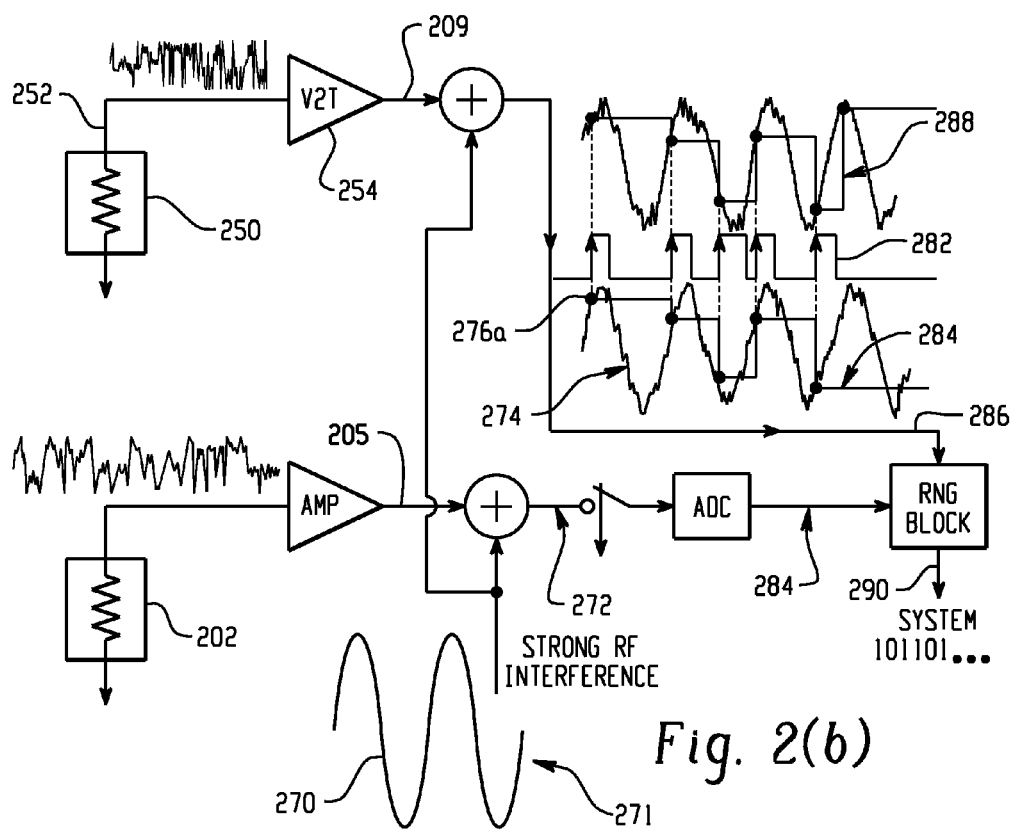

FIGS. 2(a) and 2(b) are schematic illustrations of an RNG structure 200 according to the present invention. A first analog noise source 202 produces a first random noise signal 203. In one example, the first analog noise source 202 is a hardware noise source 202 that generates the first noise signal 203 from physical process phenomena (such as thermal noise, photoelectric effect or other quantum phenomena). An amplifier 204 amplifies the first noise signal 203 into an amplified first noise signal 205 for sampling through switch 206 and conversion into discrete digital numbers by an analog-to-digital converter (ADC) 208. However, it is to be understood that other types of analog noise sources 202 may be practiced with the present invention, and if their noise signals are sufficiently large then amplification may be unnecessary and the amplifier 204 omitted.

A random sampling clock signal 209 is produced by processing a second analog noise source 250 noise signal 252 with a voltage-to-timing converter (V2T) 254. The second analog noise source 250 is may be another hardware noise source 250 that generates the second noise signal 252 from physical process phenomena (thermal noise, etc.), or an alternative noise signal generator (not shown). The random sampling clock signal 209 thus provides a random series profile 220 of sampling moments, for example as illustrated by the divergent timing apparent between rising digital pulses 222, 224, 226 for sampling the amplified noise waveform 240 at points 242, 244, 246 respectively and responsively generating a stream 210 of random digital numbers. Moreover, the random stream 210 is optionally further sampled in response to the random sampling clock signal 209, thus randomly, at an RNG block output 212 to generate an RNG block output stream 260: in this fashion an additional random factor may be introduced to further randomize the number stream output 260.

Additionally, it also is to be understood that the ADC 208 may be a one-bit or a multiple-bit ADC, and wherein a multiple bit ADC 208 may provide for additional randomness for the numbers generated by the stream 260. Thus in one example for an 8-level or 3-bit ADC 208 an output stream 260 of "11111" may represent either of both "7" (from the three-bit term 111 in binary code) and "111". In another example for a 64-level level or 6-bit ADC 208, a 6-bit series of output stream 260 numbers may represent an output of one alphanumeric random number.

Thus, the RNG 200 described thus far is a hardware-based random number generator incorporating two independent hardware noise sources 202,250 for the analog signal 205 and the random sampling clock signal 209 respectively. One advantage in providing separate independent hardware noise sources 202,250 is that the noise signals 203,252 are thus inherently asynchronous due to their independent random generation, which enables the RNG 200 to resist randomization compromise through strong RFI influence and maintain a truly random number output 260.

Figure 1B:
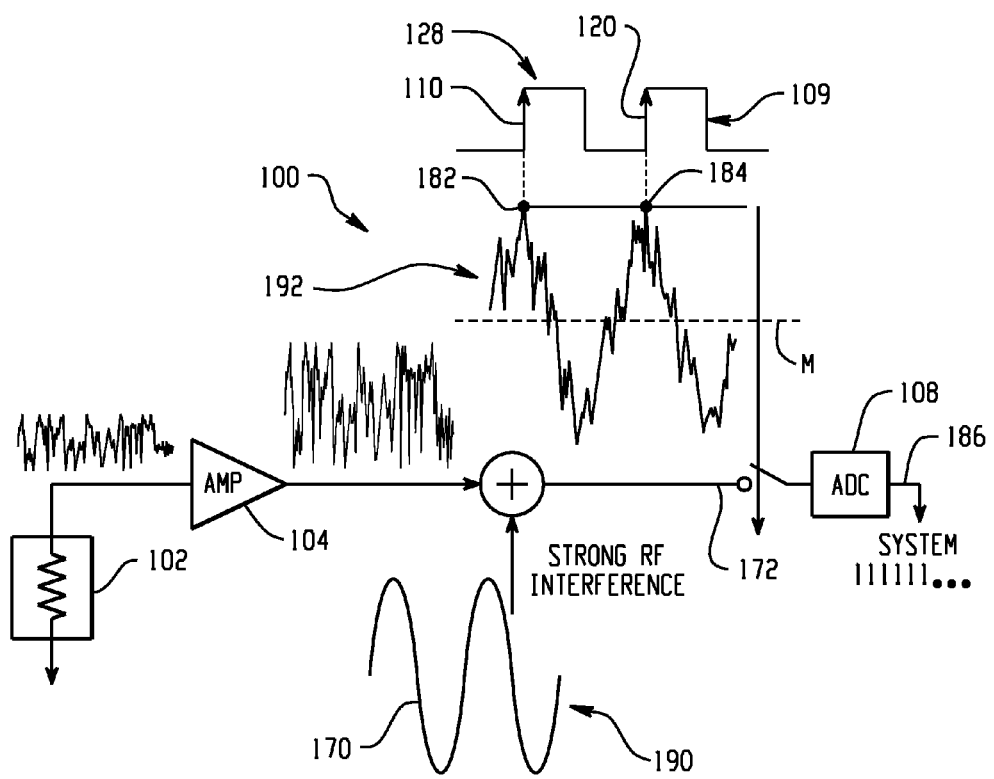

More particularly, FIG. 2(b) illustrates RNG 200 behavior under the influence of a strong RFI signal 270. The RFI signal 270 acts upon the amplified analog noise signal 205 and produces a resultant interfered analog noise signal 272 having a interfered waveform profile 274 substantially similar to the RFI signal 270 profile 271, thus compromising the randomness of the interfered analog noise signal 272. However, in contrast to the prior art hardware RNG 100 which has a constant periodic sampling clock profile 128 which may be correlated with the RFI profile 192 as shown in FIG. 1, although the RFI signal 270 acts upon the random clock signal 209 to produce a resultant altered interfered clock signal 286, changing the original sampling clock profile 220 to an RFI interfered profile 282, the interfered timing profile 282 is still random and irregular relative to the RFI profile 271.

In one aspect, randomness in the dual hardware noise source RNG 200 may be maintained against intentional EMI deterministic influences, since it is highly improbable that the first sampling moment of the random sampling clock signal 209 may be determined. However, alternative embodiments of the present invention may incorporate additional structures and methods that further make determination of the first sampling moment difficult and thus improve RNG resistance to RFI randomness reprogramming.

Figure 3:
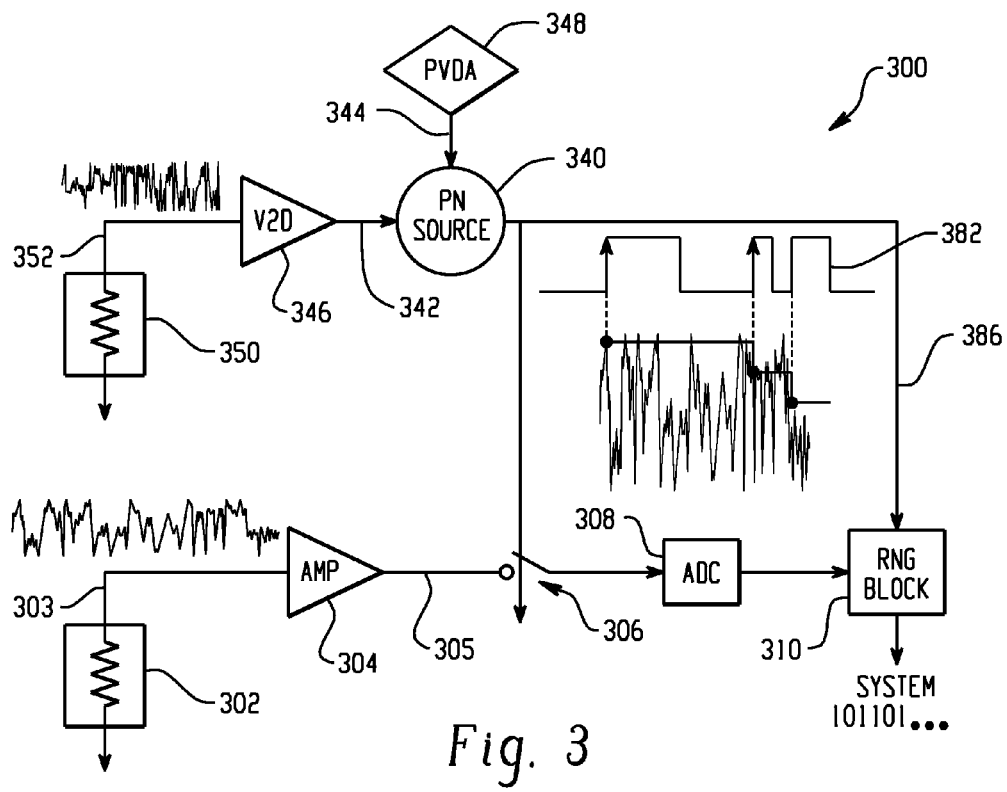
FIG. 3 is a schematic illustration of another random number generator according to the present invention.

More particularly, FIG. 3 illustrates another RNG 300 according to the present invention. An analog noise source 302 produces a random noise signal 303, for example a physical process thermal noise signal 303, although again other analog noise sources 302 may again be practiced. As the physical process noise signal 303 is low relative to RNG system 300 electrical signal levels, an amplifier 304 amplifies the noise source signal 303 into an amplified noise signal 305 for sampling through switch 306 and conversion into discrete digital numbers by an analog-to-digital converter (ADC) 308. Optionally, if the noise signal 303 is sufficiently large then amplification may be unnecessary, and thus some embodiments of an RNG 300 according to the present invention may omit the amplifier 304.

A digital Pseudo Noise (PN) source state machine 340 is used to generate a random digital sampling clock signal 386 having a timing profile 382 (and which also optionally functions as a clock for an RNG block 386) based on first seed 342, second seed 344 and past machine state inputs. The use of PN source state machines for digital random number generation is known, but what is new is that true randomness is incorporated into an otherwise pseudo random digital clock signal generation structure by providing that the first seed input 342 is the output of a voltage-to-digital converter (V2D) 346, wherein a second analog noise generator 350 noise provides a truly random analog noise signal input 352 to the V2D 346.

Moreover, the RNG 300 provides additional protection from randomization compromise through RFI by incorporating a Process Variation Digital Amplifier (PVDA) 348 to generate the random second seed input 344 to the PN source state machine 340. The PVDA 348 comprises a plurality of chips (not shown) that each function as its own random seed based upon each chip's inherent structure, as is well known in PVDA design. In one aspect, the random second seed 344 may be determined in response to the unique aging effect of each chip. One advantage is that these characteristics are not known or discoverable to unauthorized parties, or determinable through EMI. The PVDA 348 thus provides random second seed inputs 344 through digital amplification structures and techniques immune to RFI programming that, along with the analog random source first seed 342 effectively scramble the first sampling moment for every sampling period alteration, and wherein second seed 2 random input 344 may also change over time due to chip aging.

In the present embodiment, PN source output 382 randomness is enforced by sampling seed1, seed2, and the PN machine current state at the same time. Thus although PN state machines are generally considered to be pseudo-random noise sources, the algorithmic basis of the PN state machine 340 randomness may not be determined from its output since the random first and second seeds are updated regularly during every random period: accordingly the PN state machine 340 sampling clock output 386 is not pseudo random but truly random.

II. Computerized Implementation

Figure 4:
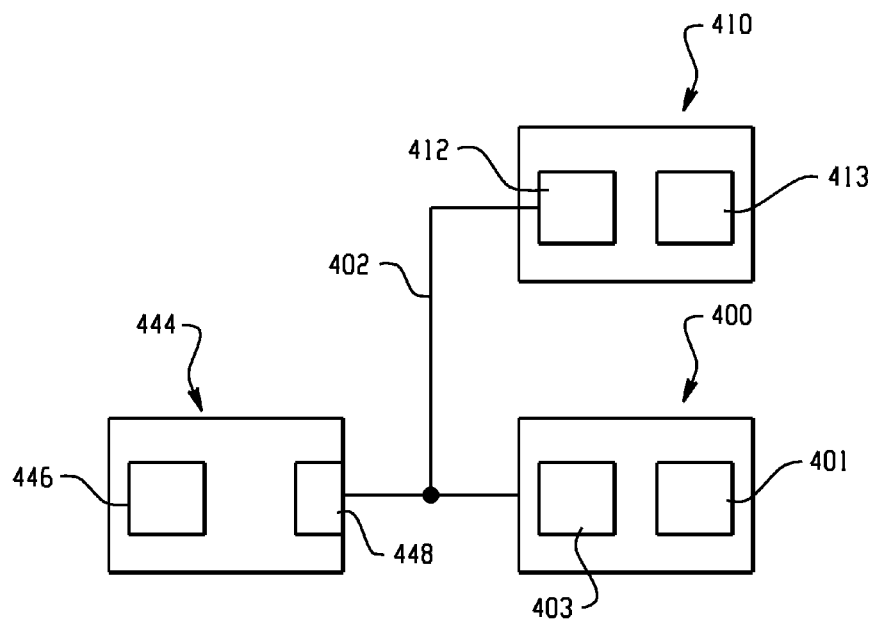
FIG. 4 is a schematic illustration of a computer system configured to practice aspects of the present invention.

Referring now to FIG. 4, computer-readable code may be integrated into a computing system 400, wherein the computing system 400 is capable of functioning as a random number generator according to the present invention. Thus, a program according to the present invention may be stored on a computing system 400 computer-readable storage medium 401, or accessible to the computing system 400 through one or more transmission mediums 402.

Thus, in one example the computing system 400 includes the RNG 300 components illustrated in FIG. 3. One advantage is that hard-coded logic may be implanted and altered within the pseudo noise state machine 340 prior to provision of said component to a third party for a RNG 300 application, thus keeping associated logic algorithms secure. In another advantage the pseudo noise state machine 340 may be manufactured or assembled into an RNG application according to the present invention by third parties, and then software randomness algorithms subsequently programmed later, enabling said algorithms to be kept confidential and secure from the third parties.

To this extent, the computer-readable/useable medium 401 includes program code that implements each of the various process steps of the invention, for example including pseudo noise state machine 340 randomness algorithms. It is understood that the terms computer-readable medium or computer useable medium comprises one or more of any type of physical embodiment of the program code. In particular, the term computer-readable/useable medium can comprise program code embodied on one or more portable storage articles of manufacture (e.g., a compact disc, a magnetic disk, a tape, etc.), on one or more data storage portions of a computing device, such as memory and/or storage system 401 (e.g., a fixed disk, a read-only memory, a random access memory, a cache memory, etc.), and/or as a data signal (e.g., a propagated signal) traveling over a network (e.g., during a wired/wireless electronic distribution of the program code) through transmission medium 402.

Illustrative but not exhaustive storage medium 401 examples include volatile memory structures, and RAM and ROM structures, but the present invention is not so limited. In one aspect of operation, the program code may be read by a disk drive or a CD-ROM reading apparatus 403, 413 and stored in a ROM device 401 or the like in the computing system 400 so as to be executed. In some examples, the program may reside on a remote computer 410 memory resource 412, or on a program transmitting apparatus 444 having a computer memory 446 for storing the program and program transmitting means 448 for providing the program to the computing system 400 or memory 401 or via the network 402.

It is to be understood that embodiments of the computing systems 400,410 include stand-alone and networked computers and multi-part computer systems. More particularly, FIG. 4 is provided to demonstrate, among other things, that the present invention could be implemented within a network environment (e.g., the Internet, a wide area network (WAN), a local area network (LAN), a virtual private network (VPN), etc.), or on a stand-alone computer system. In the case of the former, communication throughout the network can occur via any combination of various types of communications links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Moreover, the computing systems 400,410 are intended to demonstrate that some or all of the components of implementation depicted in FIG. 4 could be deployed, managed, serviced, etc. by a service provider who offers to implement, deploy, and/or perform the functions of the present invention for others.

Computing systems 400,410 are only illustrative of various types of computer infrastructures for implementing the invention. For example, in one embodiment any of the computing systems 400,410 may comprise two or more computing devices (e.g., a server cluster) that communicate over a network to perform the various process steps of the invention. Moreover, the computing systems 400,410 are only representative of various possible computer systems that can include numerous combinations of hardware. To this extent, in other embodiments, the computing systems 400,410 can comprise any specific purpose computing article of manufacture comprising hardware and/or computer program code for performing specific functions, any computing article of manufacture that comprises a combination of specific purpose and general purpose hardware/software, or can comprise any system for exchanging information with one or more external devices 444, or the like. In each case, the program code and hardware can be created using standard programming and engineering techniques, respectively.

Still further, it is understood that one or more additional components (e.g., system software, math co-processing unit, etc.) not shown in FIG. 4 can be included in the computing systems 400,410. Although not shown, additional components, such as cache memory, communication systems, system software, etc., may be incorporated into the computing systems 400,410. In one embodiment, the memory device 401 includes data distributed across, for example, a local area network (LAN), wide area network (WAN) or a storage area network (SAN) (not shown).

In another embodiment, the invention provides a business method that performs the process steps of the invention on a subscription, advertising, and/or fee basis. That is, a service provider, such as a Solution Integrator, could offer to design and/or manufacture the random number generator devices described above. In this case, the service provider can create, maintain, support, etc., a computer infrastructure, such as the computing systems 400, 410 that perform process steps of the invention for one or more customers. In one example, the service provider may implant or alter hard-coded logic within the pseudo noise state machine 340 configured to practice the RNG processes of the present invention. In another example, the service provider may program one or more randomness algorithms into the pseudo noise state machine 340 subsequent to its manufacture, assembly or deployment in an RNG process according to the present invention. In return, the service provider can receive payment from the customer(s) under a subscription and/or fee agreement and/or the service provider can receive payment from the sale of advertising content to one or more third parties.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic I/O system/driver for a particular computing and/or I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

We claim:

1. A random number generator, comprising:
   a first analog noise source that generates a first analog noise signal;
   a voltage-to-digital converter coupled to the first analog noise source that generates a random first seed in response to the first analog noise signal;
   a process variation digital amplifier that generates a random second seed;
   a pseudo noise source state machine coupled to the voltage-to-digital converter and to the process variation digital amplifier that generates a random digital clock signal comprising a random series of a plurality of divergent timing sampling periods in response to the first seed, the second seed and a past machine state input;
   a second analog noise source that generates a second analog noise signal asynchronous to the first analog noise signal; and
   an analog-to-digital converter coupled to the second analog noise source and to the pseudo noise source state machine that samples the second analog noise signal in response to the random digital clock signal and generates a random digital number stream: and
   a random number generator output block coupled to the pseudo noise source state machine and the analog-to-digital converter that samples the analog-to-digital converter random digital number stream in response to the random digital clock signal and generates a random number generator block output.

2. The random number generator of claim 1, wherein the first and the second analog noise sources are physical process phenomena.

3. The random number generator of claim 1, further comprising:
   an amplifier coupled between the second analog noise source and the second converter.

4. The random number generator of claim 3, wherein the process variation digital amplifier comprises a plurality of microprocessor chips;
   wherein the process variation digital amplifier is configured to assign a unique random seed to each of the plurality of chips; and
   wherein the process variation digital amplifier is configured to determine the second seed from the plurality of unique random seeds.

5. The random number generator of claim 4, wherein the process variation digital amplifier is further configured to determine the second seed from an aging effect of each of the plurality of unique random seeds.

6. A method for random number generation, the method comprising:
   a first analog noise source generating a first analog noise signal;
   a voltage-to-digital converter generating a random first seed in response to the first analog noise signal;
   a process variation digital amplifier generating a random second seed;
   a pseudo noise source state machine generating a random digital clock signal comprising a random series of a plurality of divergent timing sampling periods in response to the first seed, the second seed and a past machine state input;
   generating a second analog noise signal from a second analog noise source, the second analog noise signal asynchronous to the first analog noise signal;
   an analog-to-digital converter sampling the second analog noise signal in response to the random digital clock signal and generating a random digital number stream as a function of the second analog noise signal sampling; and
   a random number generator output block sampling the analog-to-digital converter random digital number stream in response to the random digital clock signal and generating a random number generator block output.

7. The method of claim 6, wherein the first and the second analog noise sources are physical process phenomena.

8. The method of claim 6, further comprising:
   amplifying the second analog noise signal; and
   wherein the step of sampling the second analog noise signal in response to the random digital clock signal comprises sampling the amplified second analog noise signal.

9. The method of claim 8, wherein the process variation digital amplifier comprises a plurality of microprocessor chips, the method further comprising:
   assigning a unique random seed to each of the plurality of microprocessor chips; and
   wherein the generating the random second seed comprises determining the second seed from the plurality of unique random seeds.

10. The method of claim 9, further comprising:
    determining the second seed from an aging effect of each of the plurality of unique random seeds.

11. A method for random number generation, comprising:
    providing a computing infrastructure, the computing infrastructure comprising:
    a first analog noise source that generates a first analog noise signal;
    a voltage-to-digital converter that generates a random first seed in response to the first analog noise signal;

a process variation digital amplifier that generates a random second seed;

a pseudo noise source state machine that generates a random digital clock signal comprising a random series of a plurality of divergent timing sampling periods in response to the first seed, the second seed and a past machine state input;

a second analog noise source that generates a second analog noise signal that is asynchronous to the first analog noise signal;

an analog-to-digital converter that samples the second analog noise signal in response to the random digital clock signal and generates a random digital number stream as a function of the sampled second analog noise signal; and a random number generator output block that samples the analog-to-digital converter random digital number stream in response to the random digital clock signal and generates a random number generator block output.

12. The method for random number generation of claim 11, wherein the first and the second analog noise sources are physical process phenomena.

13. The method for random number generation of claim 11, further comprising:

amplifying the second analog noise signal; and wherein the sampling the second analog noise signal in response to the random digital clock signal comprises sampling the amplified second analog noise signal.

14. The method for random number generation of claim 13, wherein the process variation digital amplifier comprises a plurality of microprocessor chips, the method further comprising:

assigning a unique random seed to each of the plurality of microprocessor chips; and wherein the generating the random second seed comprises determining the second seed from the plurality of unique random seeds.

15. The method for random number generation of claim 14, further comprising:

determining the second seed from an aging effect of each of the plurality of unique random seeds.

16. A computer program product for random number generation, the computer program product comprising:

a computer readable storage medium having computer readable program code embodied therewith, the computer readable program code comprising:

computer readable program code configured to generate a first analog noise signal from a first analog noise source;

generate a random first seed from a voltage-to-digital converter in response to the first analog noise signal;

generate a random second seed from a process variation digital amplifier;

generate a random digital clock signal comprising a random series of a plurality of divergent timing sampling periods from a pseudo noise source state machine in response to the first seed, the second seed and a past machine state input;

generate a second analog noise signal that is asynchronous to the first analog noise signal from a second analog noise source;

utilize an analog-to-digital converter to sample the second analog noise signal in response to the random digital clock signal and generate a random digital number stream as a function of the sampled second analog noise signal; and utilize a random number generator output block to sample the analog-to-digital converter random digital number stream in response to the random digital clock signal and generate a random number generator block output.

17. The computer program product of claim 16, wherein the first and the second analog noise sources are physical process phenomena.

18. The computer program product of claim 16, wherein the computer readable program code is further configured to:

amplify the second analog noise signal; and wherein the analog-to-digital converter samples the amplified second analog noise signal.

19. The computer program product of claim 18, wherein the process variation digital amplifier comprises a plurality of microprocessor chips, and wherein the computer readable program code is further configured to:

assign a unique random seed to each of the plurality of microprocessor chips; and wherein the process variation digital amplifier generates the random second seed by determining the random second seed from the plurality of unique random seeds.

20. The computer program product of claim 19, wherein the computer readable program code is further configured to determine the second seed from an aging effect of each of the plurality of unique random seeds.

* * * * *